(12) United States Patent
Wise (10) Patent No.: US 6,930,421 B2
(45) Date of Patent: Aug. 16, 2005

(54) TORQUE CONVERTER AND SYSTEM USING THE SAME

(75) Inventor: Richard J. Wise, British Columbia (CA)

(73) Assignee: Magnetic Torque International, Ltd., Bridgetown (BB)

(*) Notice: Subject to any disclaimer, the term of this patent is extended or adjusted under 35 U.S.C. 154(b) by 0 days.

(21) Appl. No.: 10/758,000

(22) Filed: Jan. 16, 2004

(65) Prior Publication Data

US 2004/0150279 A1 Aug. 5, 2004

Related U.S. Application Data

(60) Provisional application No. 60/440,622, filed on Jan. 17, 2003.

(51) Int. Cl.[7] .............................. H02K 37/00; H02K 1/00
(52) U.S. Cl. ........................ 310/103; 310/114; 310/46
(58) Field of Search .......................... 310/46, 103, 112, 310/114, 75 D, 75 R, 102 R, 156.07, 156.43

(56) References Cited

U.S. PATENT DOCUMENTS

| | | | | |
|---|---|---|---|---|
| 2,243,555 A | * | 5/1941 | Faus | ............................ 310/103 |
| 2,378,129 A | * | 6/1945 | Chambers | .................... 310/103 |
| 4,196,365 A | * | 4/1980 | Presley | ......................... 310/23 |
| 4,751,486 A | | 6/1988 | Minato | |
| 5,594,289 A | | 1/1997 | Minato | |
| 6,084,322 A | * | 7/2000 | Rounds | ........................ 310/46 |

* cited by examiner

Primary Examiner—Tran Nguyen
(74) Attorney, Agent, or Firm—Morgan, Lewis & Bockius LLP (57) ABSTRACT

A torque converter includes a flywheel rotating about a first axis, the flywheel including a first body portion, a first plurality of permanent magnets mounted in the first body portion, each of the first plurality of permanent magnets extending along a corresponding radial axis direction with respect to the first axis, and a second plurality of permanent magnets mounted in the first body portion, each of the second plurality of permanent magnets being located between a corresponding adjacent pair of the first plurality of permanent magnets, and a generator disk rotatable about a second axis perpendicular to the first axis, the generator disk including a second body portion, and a third plurality of permanent magnets within the second body portion magnetically coupled to the first and second pluralities of permanent magnets.

29 Claims, 9 Drawing Sheets

FIG.7

TORQUE CONVERTER AND SYSTEM USING THE SAME

The present application claims the benefit of U.S. Provisional Patent Application No. 60/440,622 filed on Jan. 17, 2003, which is hereby incorporated by reference.

BACKGROUND OF THE INVENTION

1. Field of the Invention

The present invention relates to a torque converter and a system using a torque converter. More specifically, the present invention relates to a torque converter that is capable of multiplying a given torque input based upon compression and decompression of permanent magnetic fields. In addition, the present invention relates to a system that uses a torque converter.

2. Discussion of the Related Art

In general, torque converters make use of mechanical coupling between a generator disk and a flywheel to transmit torque from the flywheel to the generator disk. However, due to frictional forces between the generator disk and the flywheel, some energy provided to the generator disk is converted into frictional energy, i.e., heat, thereby reducing the efficiency of the torque converter. In addition, the frictional forces cause significant mechanical wear on all moving parts of the torque converter.

SUMMARY OF THE INVENTION

Accordingly, the present invention is directed to a torque converter that substantially obviates one or more of the problems due to limitations and disadvantages of the related art.

An object of the present invention is to provide a torque converter having an increased output.

Another object of the present invention is to provide a system using a torque converter that reduces frictional wear.

Another object of the present invention is to provide a system using a torque converter that does not generate heat.

Another object of the present invention is to provide a system using a torque converter than does not have physical contact between a flywheel and a generator disk.

Another object of the present invention is to provide a system using a torque converter that allows an object to be inserted or reside between a flywheel and a generator disk.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a torque converter includes a flywheel rotating about a first axis, the flywheel including a first body portion, a first plurality of permanent magnets mounted in the first body portion, each of the first plurality of permanent magnets extending along a corresponding radial axis direction with respect to the first axis, and a second plurality of permanent magnets mounted in the first body portion, each of the second plurality of permanent magnets being located between a corresponding adjacent pair of the first plurality of permanent magnets, and a generator disk rotatable about a second axis perpendicular to the first axis, the generator disk including a second body portion, and a third plurality of permanent magnets within the second body portion magnetically coupled to the first and second pluralities of permanent magnets.

In another aspect, a system for generating electrical power includes a motor, a flywheel coupled to the motor, the flywheel rotating about a first axis and including a first body portion, a first plurality of permanent magnets mounted in the first body portion, each of the first plurality of permanent magnets extending along a corresponding radial axis direction with respect to the first axis, and a second plurality of permanent magnets mounted in the first body portion, each of the second plurality of permanent magnets being located between a corresponding adjacent pair of the first plurality of permanent magnets, at least one generator disk rotatable about a second axis perpendicular to the first axis and magnetically coupled to the flywheel, the generator disk including a second body portion, and a third plurality of permanent magnets within the second body portion magnetically coupled to the first and second pluralities of permanent magnets, and an electrical generator coupled to the generator disk.

In another aspect, a system for converting torque to power includes a motor, a flywheel coupled to the motor, the flywheel rotating about a first axis and including a first body portion, a first plurality of permanent magnets mounted in the first body portion, each of the first plurality of permanent magnets extending along a corresponding radial axis direction with respect to the first axis, and a second plurality of permanent magnets mounted in the first body portion; each of the second plurality of permanent magnets being located between a corresponding adjacent pair of the first plurality of permanent magnets, at least one generator disk rotatable about a second axis perpendicular to the first axis and magnetically coupled to the flywheel, each generator disk including a second body portion and a third plurality of permanent magnets within the second body portion magnetically coupled to the first and second pluralities of permanent magnets, and a second drive shaft coupled to the second body portion rotating about the second axis.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention. In the drawings.

DETAILED DESCRIPTION OF THE PREFERRED EMBODIMENTS

Reference will now be made in detail to the illustrated embodiments of the present invention, examples of which are illustrated in the accompanying drawings.

Figure 1:
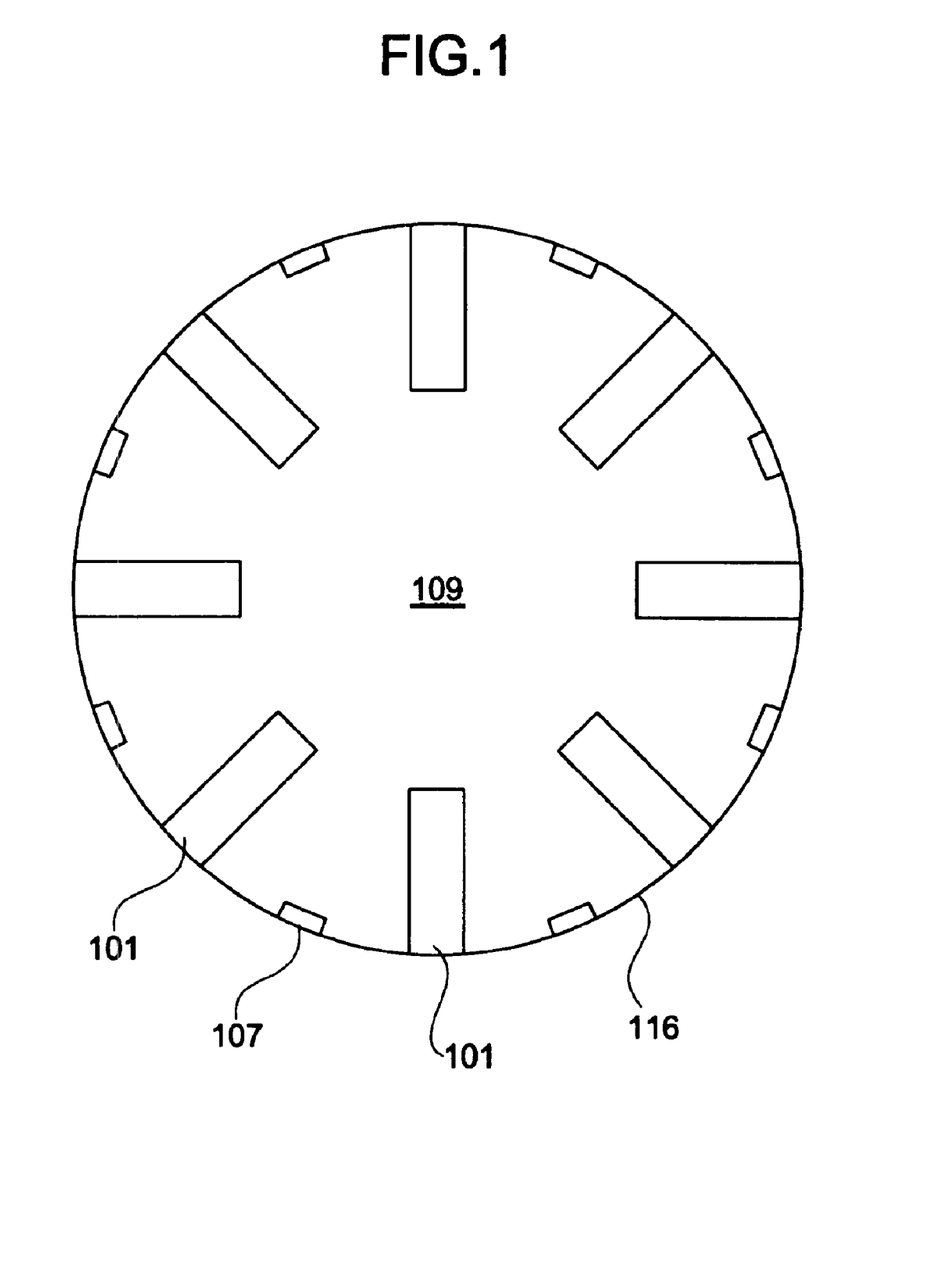
FIG. 1 is a layout diagram of an exemplary flywheel according to the present invention.

FIG. 1 is a layout diagram of an exemplary flywheel according to the present invention. In FIG. 1, a flywheel 109 may be formed from a cylindrical core of composite material (s), such as nylon, and may be banded along a circumferential edge of the flywheel by a non-magnetic ring 116, such as non-magnetic stainless steel or phenolic materials. The flywheel 109 may include a plurality of magnets disposed within a plurality of equally spaced first radial grooves 101 of the flywheel 109, wherein each of the magnets may generate relatively strong magnetic fields, such as 48 $mgo_e$ (magnetic gauss orsted) or larger magnets. In addition, each of the magnets may have cylindrical shapes and may be backed by a cylindrically shaped backing plate 203 (in FIG. 3), such as soft iron or steel, disposed within each of the plurality of first radial grooves 101.

The magnets may be charged prior to installation within the plurality of first radial grooves 101 of the flywheel 109 by applying approximately ±485,500 watts of electricity (475 volts×1022 amps) to uncharged material for approximately 0.01 seconds. Alternatively, the magnets may be charged by application of specific amounts of power and/or specific periods of time depending on the desire magnetic strength of the magnets.

In FIG. 1, the flywheel 109 may also include a plurality of suppressor magnets disposed within a plurality of second radial grooves 107 along a circumferential face of the flywheel 109, wherein surfaces of the suppressor magnets may be recessed from the nonmagnetic ring 116. In addition, each of the plurality of second radial grooves 107 may be disposed between each of the plurality of first grooves 101. For example, each one of eight suppressor magnets may be disposed within each of eight grooves 107 and each one of eight magnets may be disposed within each of eight grooves 101. Of course, the total number of magnets within the first and second grooves 101 and 107 may be changed. Accordingly, the suppressor magnets in the eight grooves 107 and the magnets in the eight grooves 101 of the flywheel 109 have their north magnetic fields facing toward the circumference of the flywheel 109 and their south magnetic fields facing radial inward toward a center portion of the flywheel 109.

Figure 3:
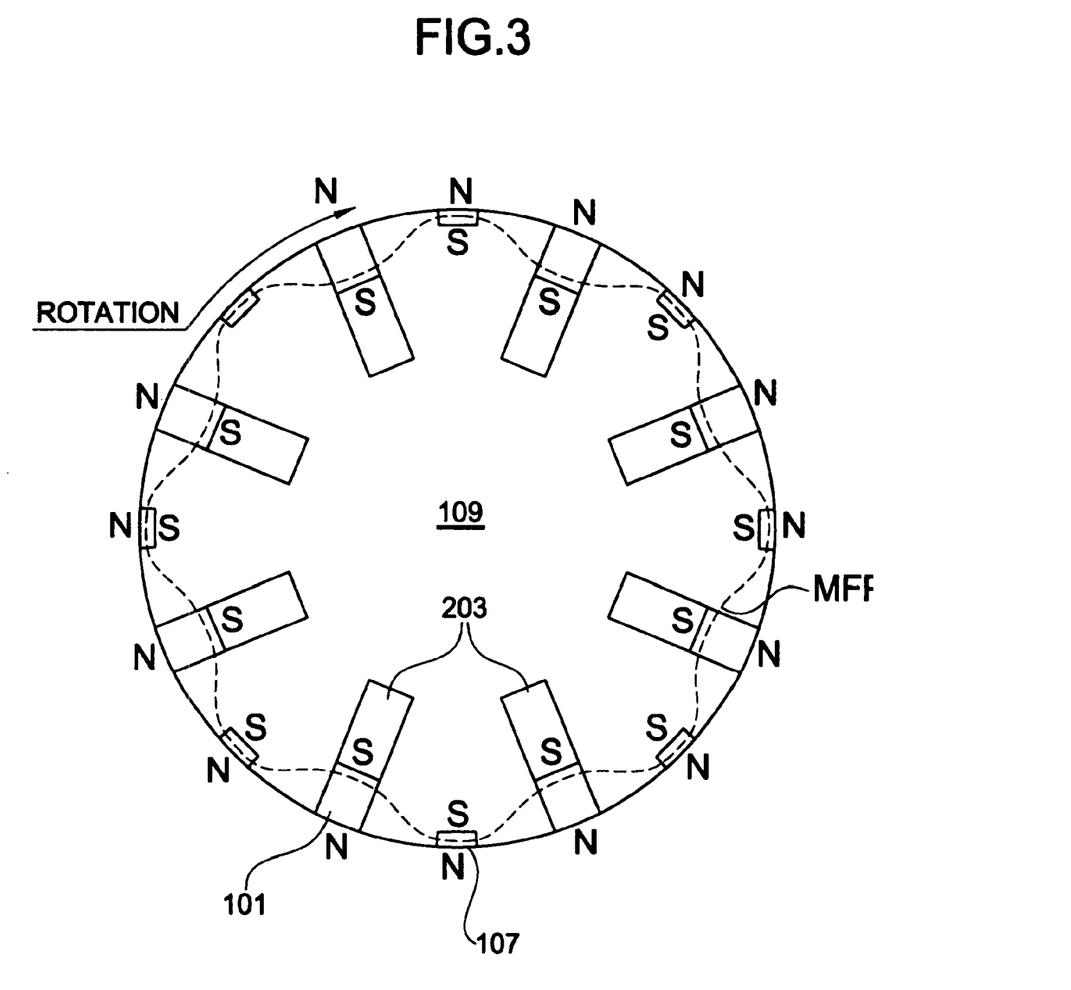
FIG. 3 is a schematic diagram of exemplary magnetic fields of the flywheel of FIG. 1 according to the present invention.

The backing plates 203 (in FIG. 3) disposed at end portions of the magnets disposed within the plurality of first grooves 101 at the south poles of the magnets force a magnetic field strength along a radial direction toward the circumference of the flywheel 109. Accordingly, interactions of the magnetic fields of the magnets within the plurality of first grooves 101 and the suppressor magnets disposed within the plurality of second grooves 107 create a magnetic field pattern (MFP), as shown in FIG. 3, of repeating arcuate shapes, i.e. sinusoidal curve, around circumferential edge portions of the flywheel 109.

Figure 2:
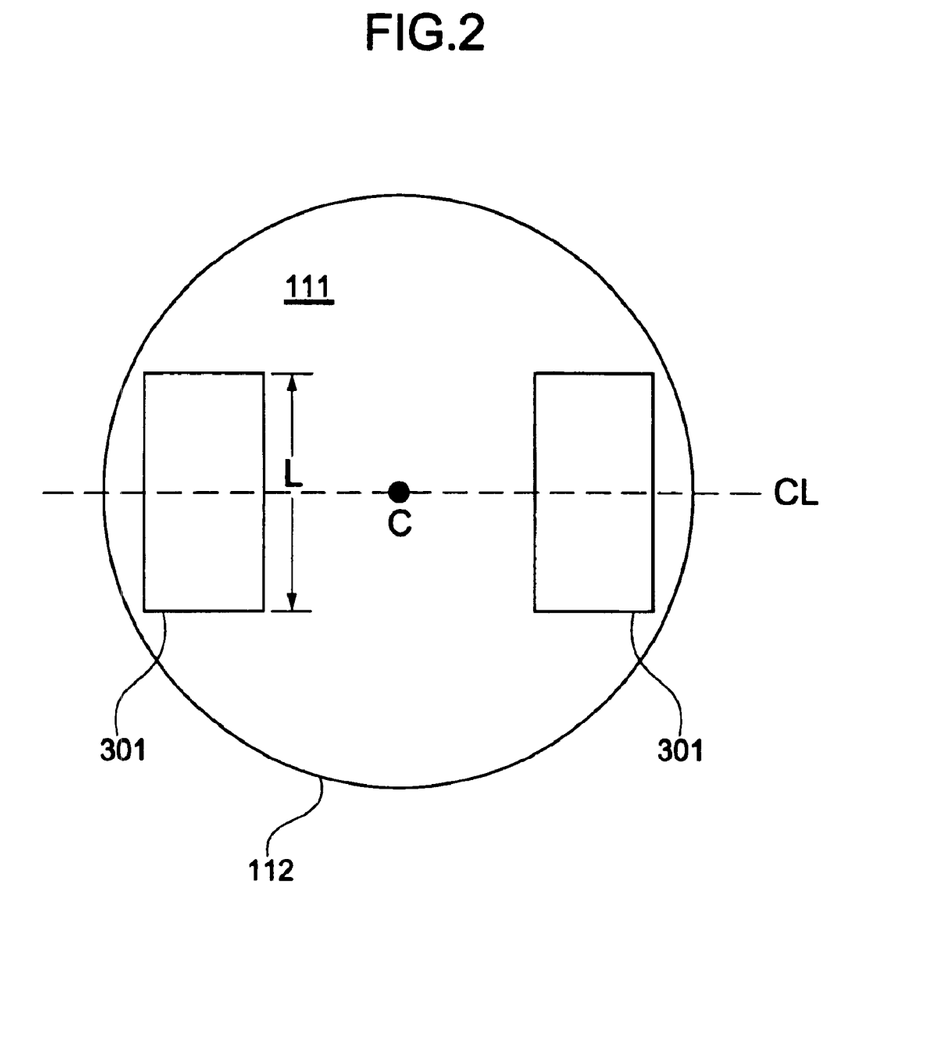
FIG. 2 is a layout diagram of an exemplary generator disk according to the present invention.

FIG. 2 is a layout diagram of an exemplary generator disk according to the present invention. In FIG. 2, a generator disk 111, preferably made from a nylon or composite nylon disk, may be banded by a stainless steel ring 112. The generator disk 111 may include two rectangular magnets 301 opposing each other along a common center line CL through a center portion C of the generator disk 111, wherein each of the rectangular magnets 301 may be disposed along a circumferential portion of the generator disk 111. Each of the rectangular magnets 301 may have a first length L extending along a direction perpendicular to the common center line, wherein a thickness of the rectangular magnets 301 may be less than the first length. In addition, each of the rectangular magnets 301 may have a relatively large magnetic strength, such as about 48 $mgo_e$ or more, wherein surfaces of the rectangular magnets 301 parallel to a major surface of the generator disk may be one of south and north poles. Although the total number of magnets 301 is shown to be two, a plurality of magnets 301 may be used. Moreover, either an even-number or odd-number of magnets 301 may be used, and interval spacings between the magnets 301 may be adjusted to attain a desired magnetic configuration.

Figure 4:
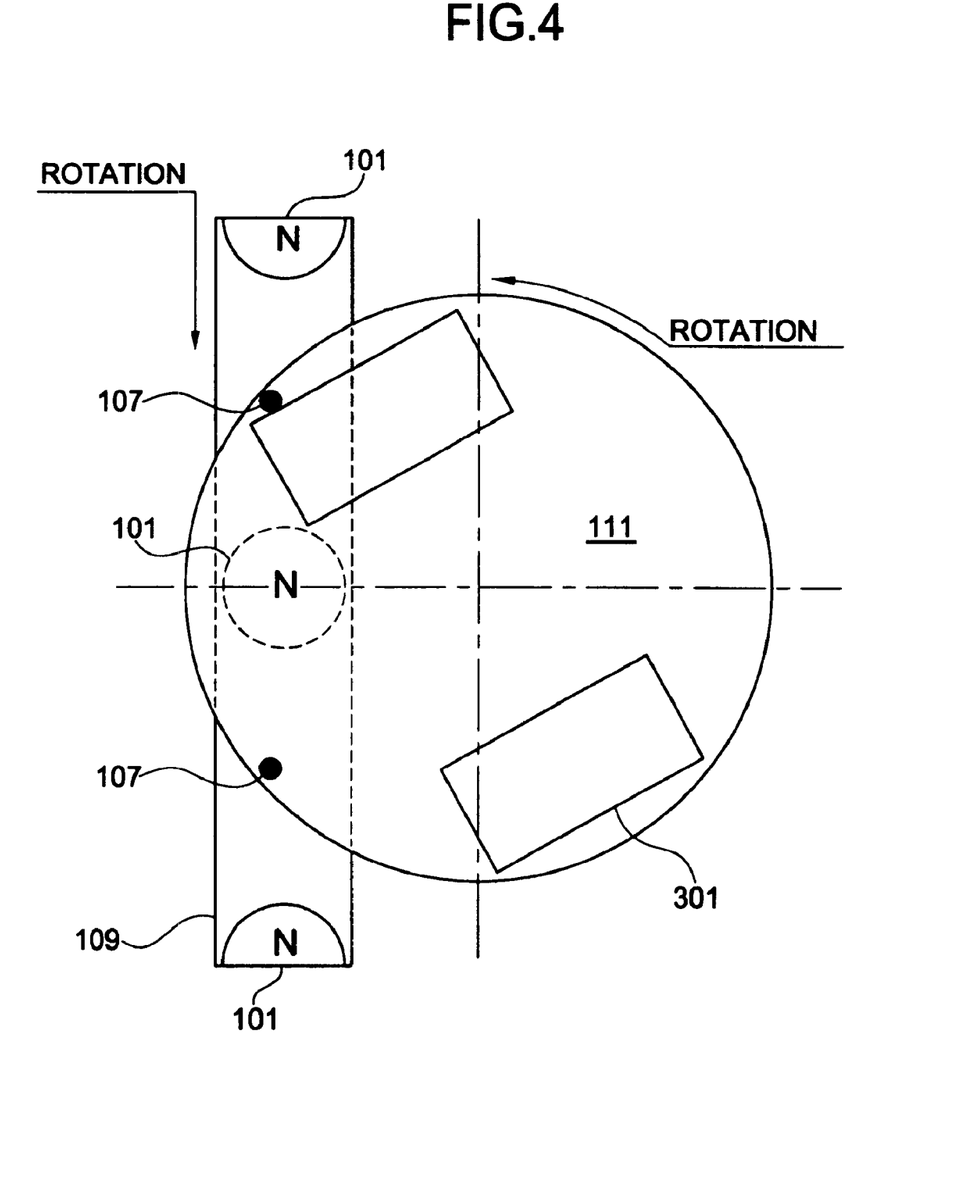
FIG. 4 is a schematic diagram of an exemplary initial magnetic compression process of the torque converter according to the present invention.
Figure 5:
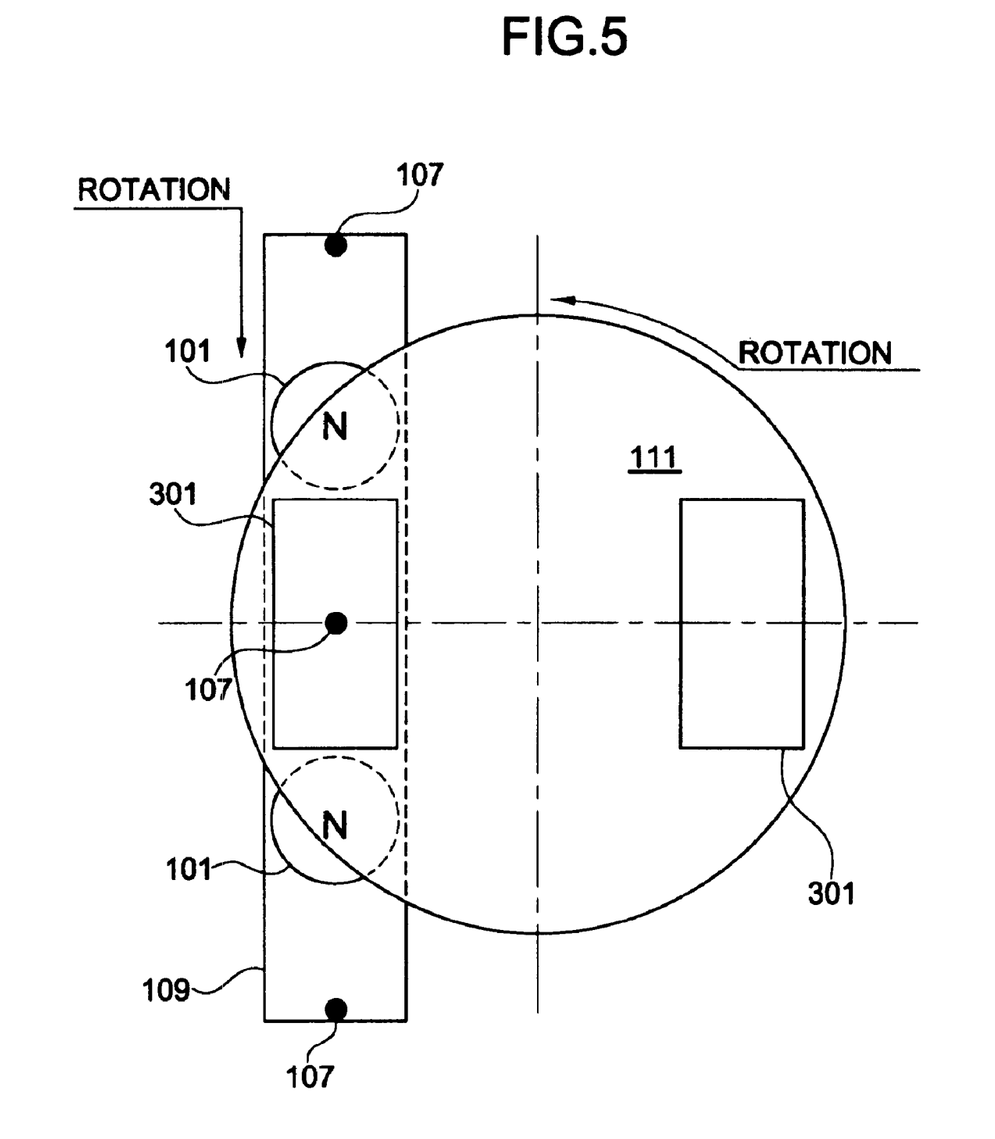
FIG. 5 is a schematic diagram of an exemplary magnetic compression process of the torque converter according to the present invention.
Figure 6:
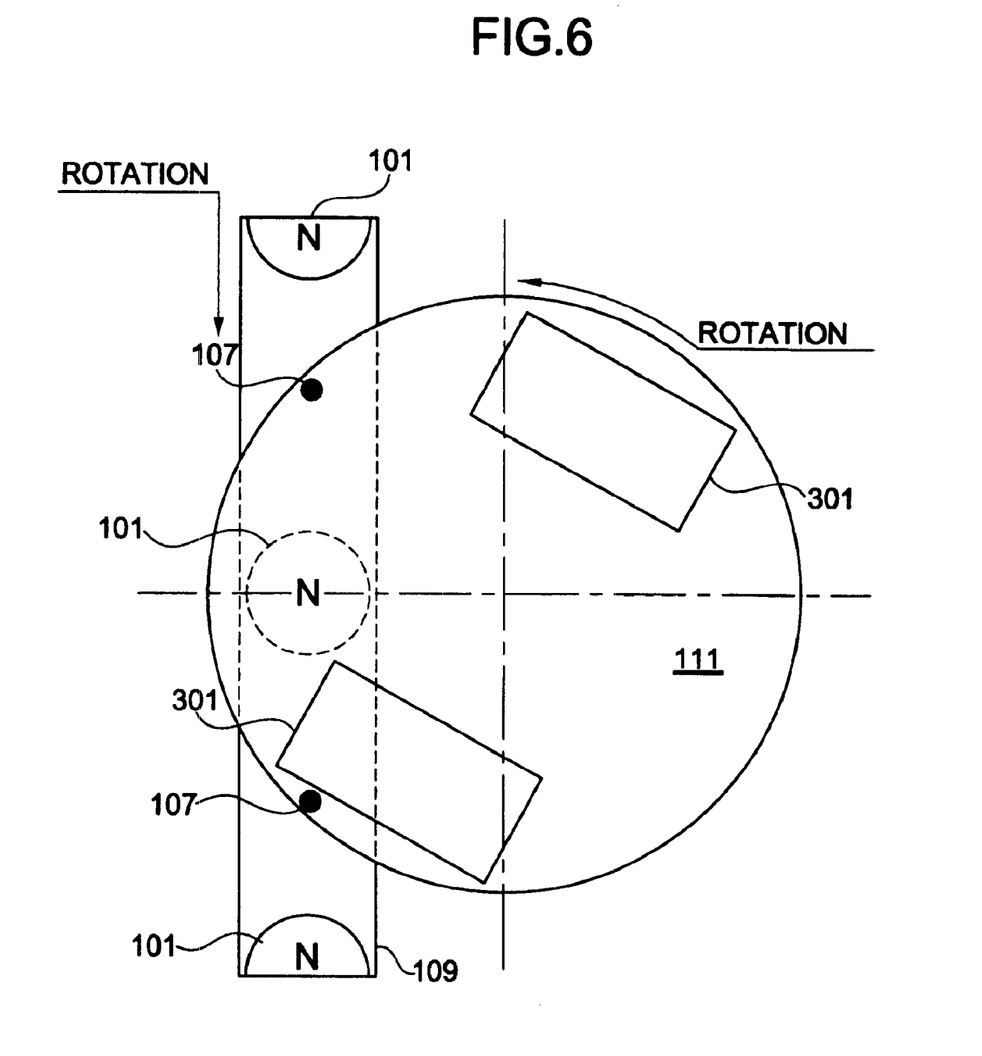
FIG. 6 is a schematic diagram of an exemplary magnetic decompression process of the torque converter according to the present invention.

FIG. 4 is a schematic diagram of an exemplary initial magnetic compression process of the torque converter according to the present invention, FIG. 5 is a schematic diagram of an exemplary magnetic compression process of the torque converter according to the present invention, and FIG. 6 is a schematic diagram of an exemplary magnetic decompression process of the torque converter according to the present invention. In each of FIGS. 4, 5, and 6, the schematic view is seen from a rear of the generator disk, i.e., the surface opposite to the surface of the generator wheel 111 having the rectangular magnets 301, and the flywheel 109 is located behind the generator wheel 111. In addition, the flywheel 109 is rotating in a downward clockwise direction and the generator wheel 111 is rotating along an upward counterclockwise direction, wherein the generator disk 111 may be spaced from the flywheel 109 by a small air gap, such as within a range of about three-eighths of an inch to about 0.050 inches. Alternatively, the small air gap may be determined by specific application. For example, systems requiring a larger configuration of the flywheel and generator disk may require larger or smaller air gaps. Similarly, systems requiring more powerful or less powerful magnets may require air gaps having a specific range of air gaps. Moreover, for purposes of explanation the plurality of first grooves 101 will now simply be referred to as driver magnets 101, and the plurality of second grooves 107 will now simply be referred to as suppressor magnets 107.

In FIG. 4, the two rectangular magnets 301 disposed on the generator disk 111 begin to enter one of the spaces within a magnetic field pattern (MFP) of the flywheel 109 between two north poles generated by the driver magnets 101. The driver magnets 101 may be disposed along a circumferential center line of the flywheel 109, or may be disposed along the circumference of the flywheel in an offset configuration. The gap between the driver magnets 101 in the flywheel 109 is a position in which the MFP where the south pole field is the closest to the outer perimeter of the flywheel 109. As the flywheel rotates along the downward direction, the north poles of the rectangular magnets 301 on the generator disk 111 facing the circumferential edge portion of the flywheel 109 are repelled by the north poles of the driver magnets 101 of the flywheel 109.

Figure 7:
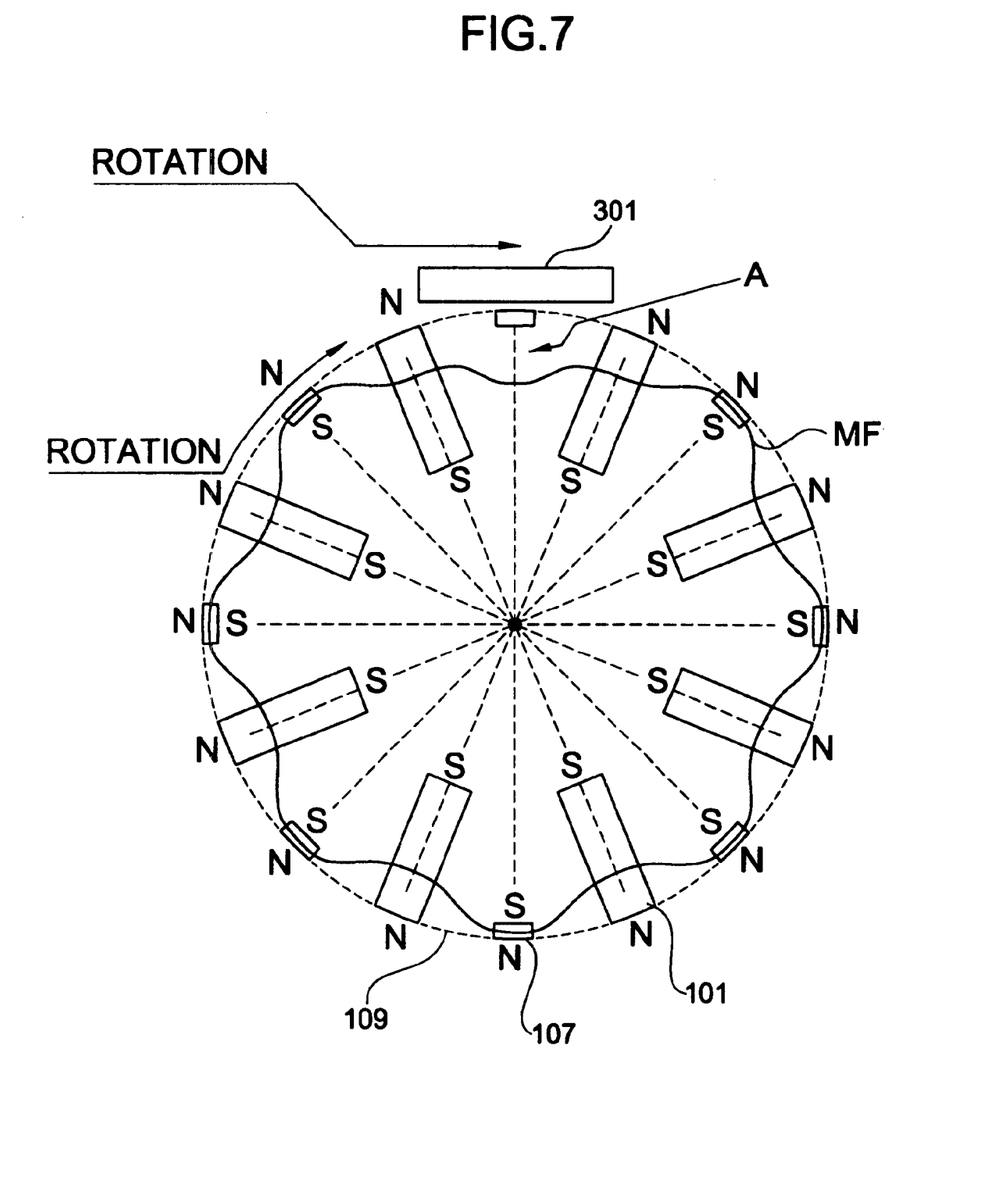
FIG. 7 is a schematic diagram of an exemplary magnetic force pattern of the flywheel of FIG. 1 during a magnetic compression process of FIG. 5 according to the present invention.

In FIG. 5, once one of the rectangular magnets 301 on the generator disk 111 fully occupies the gap directly between the north poles of two adjacent driver magnets 101 of the flywheel 109, the weaker north pole of the suppressor magnet 107 on the flywheel 109 is repelled by the presence of the north pole of the rectangular magnet 301 on the generator wheel 111. Thus, both the north and south magnetic fields of the MFP below the outer circumference of the flywheel 109 are compressed, as shown at point A (in FIG. 7).

In FIG. 6, as the rectangular magnet 301 on the generator disk 111 begins to rotate out of this position and away from the flywheel 109, the north pole of the rectangular magnet 301 is strongly pushed away by the repulsion force of the north pole of the trailing driver magnet 101 on the flywheel 109 and by the magnetic decompression (i.e., spring back) of the previously compressed north and south fields in the MFP along the circumferential portion of the flywheel 109. The spring back force (i.e., magnetic decompression force) of the north pole in the MFP provides added repulsion to the rectangular magnet 301 of the generator disk 111 as the rectangular magnet 301 moves away from the flywheel 109.

Next, another initial magnetic compression process is started, as shown in FIG. 4, and the cycle of magnetic compression and decompression repeats. Thus, rotational movement of the flywheel 109 and the generator disk 111 continues.

Figure 8:
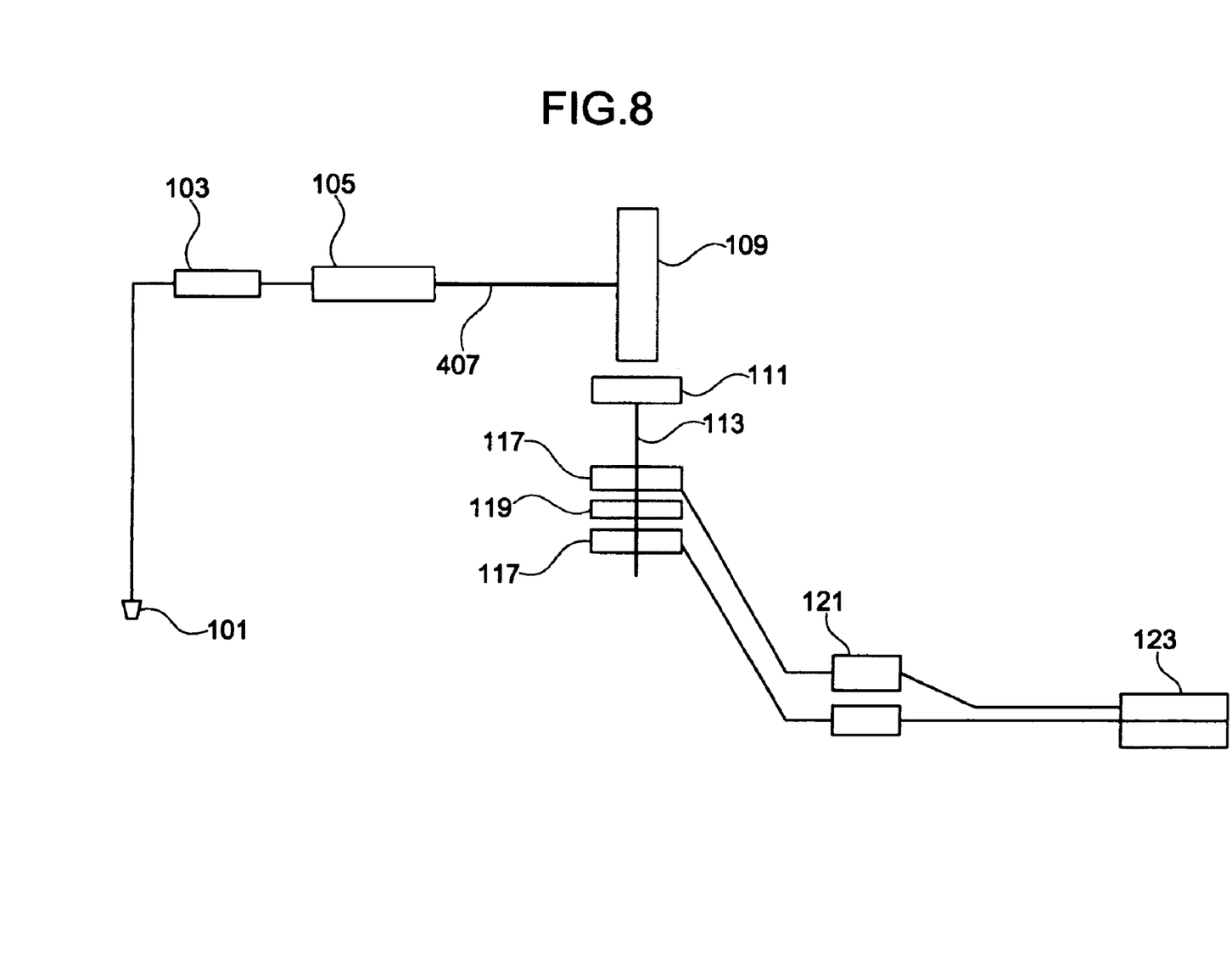
FIG. 8 is a schematic diagram of an exemplary system using the torque converter according to the present invention.

FIG. 8 is a schematic diagram of an exemplary system using the torque converter according to the present invention. In FIG. 8, a system for generating power using the torque converted configuration of FIGS. 4–7 may include a motor 105 powered by a power source 101 using a variable frequency motor control drive 103 to rotatably drive a shaft 407 coupled to the flywheel 109 (also shown in FIGS. 4–7). In addition, the generator disk 111 may be coupled to a drive shaft 113, wherein rotation of the generator disk 111 will cause rotation of the drive shaft 113. For example, a longitudinal axis of the drive shaft 113 may be disposed perpendicular to a longitudinal axis of the drive shaft 107.

In FIG. 8, the drive shaft 113 may be coupled to an electrical generator comprising a rotor 119 and a plurality of stators 117. Accordingly, rotation of the rotor 119 may cause the electrical generator to produce an alternating current output to a variable transformer 121. Thus, the output of the variable transformer 121 may be provided to a load 123.

Figure 9:
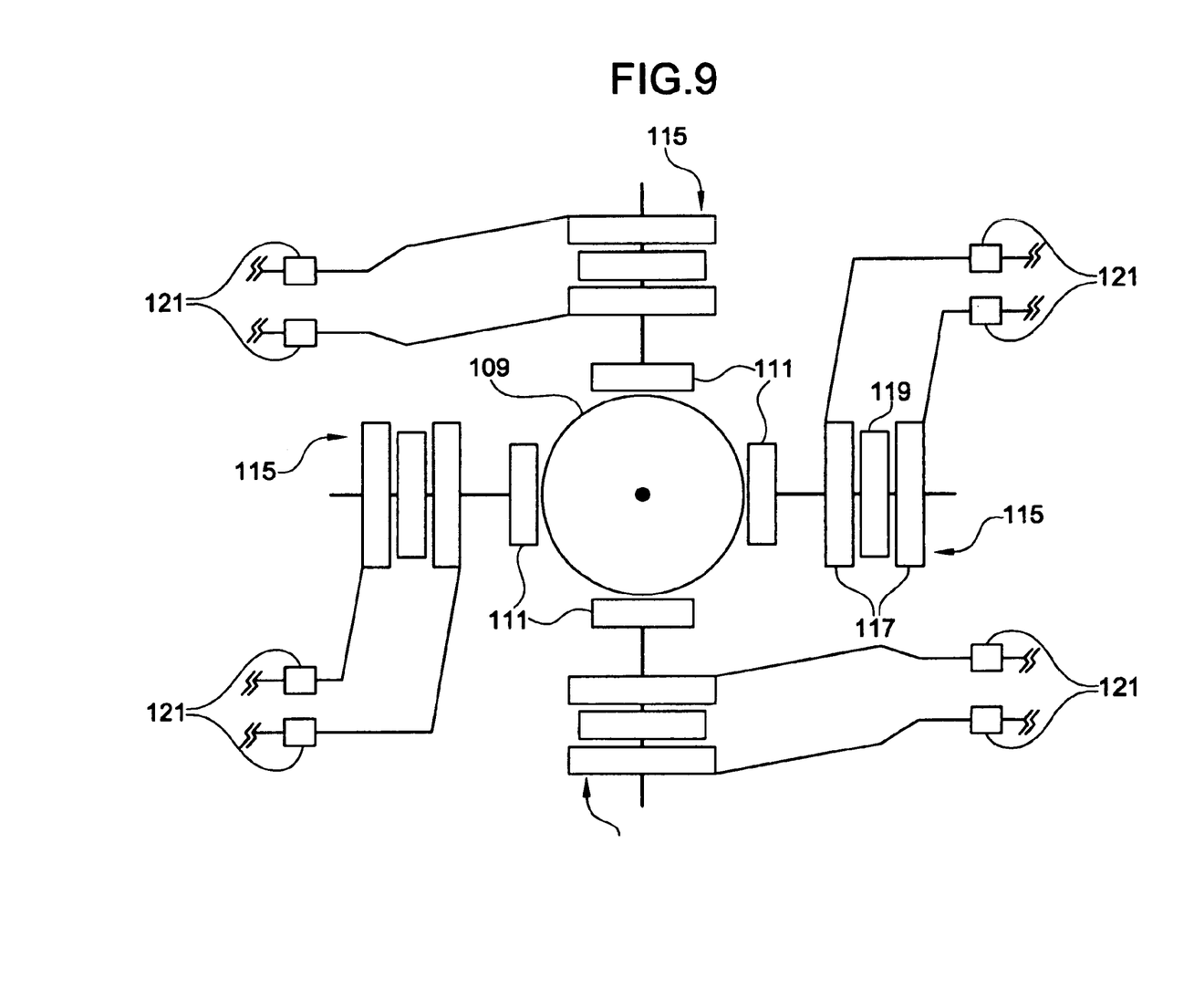
FIG. 9 is a schematic diagram of another exemplary system using the torque converter according to the present invention.

FIG. 9 is a schematic diagram of another exemplary system using the torque converter according to the present invention. In FIG. 9, a plurality of the generator disks 111 may be clustered around and driven by a single flywheel 109, wherein the generator disks 111 may each be coupled to AC generators similar to the configuration shown in FIG. 8.

The present invention may be modified for application to mobile power generation source systems, as drive systems for application in stealth technologies, as an alternative for variable speed direct drive systems, as drive systems for pumps, fans, and HVAC systems. Moreover, the present invention may be modified for application to industrial, commercial, and residential vehicles requiring frictionless, gearless, and/or fluidless transmissions. Furthermore, the present invention may be modified for application in frictionless fluid transmission systems through pipes that require driving of internal impeller systems. Furthermore, the present invention may be modified for application in onboard vehicle battery charging systems, as well as power systems for aircraft, including force transmission systems for aircraft fans and propellers.

In addition, the present invention may be modified for application in zero or low gravity environments. For example, the present invention may be applied for use as electrical power generations systems for space stations and interplanetary vehicles.

It will be apparent to those skilled in the art that various modifications and variations can be made in the torque converter and system using the same of the present invention without departing from the spirit or scope of the inventions. Thus, it is intended that the present invention covers the modifications and variations of this invention provided they come within the scope of the appended claims and their equivalents.

What is claimed is:

1. A torque converter, comprising:
   a flywheel rotating about a first axis, the flywheel including:
   a first body portion;
   a first plurality of permanent magnets mounted in the first body portion, each of the first plurality of permanent magnets extending along a corresponding radial axis direction with respect to the first axis; and
   a second plurality of permanent magnets mounted in the first body portion; each of the second plurality of permanent magnets being located between a corresponding adjacent pair of the first plurality of permanent magnets; and
   a generator disk rotatable about a second axis perpendicular to the first axis, the generator disk including:
   a second body portion; and
   a third plurality of permanent magnets within the second body portion magnetically coupled to the first and second pluralities of permanent magnets.

2. The torque converter according to claim 1, wherein the flywheel further comprises a plurality of backing plates, each backing plate disposed adjacent to each of the first plurality of permanent magnets.

3. The torque converter according to claim 2, wherein the backing plates force a magnetic field strength along the radial axis direction toward a circumference of the flywheel.

4. The torque converter according to claim 3, wherein the first and second pluralities of permanent magnets and the backing plates form a sinusoidal magnetic force pattern along the circumference of the flywheel.

5. The torque converter according to claim 4, wherein the third plurality of permanent magnets are magnetically coupled to the first and second pluralities of permanent magnets when the flywheel is rotated about the first axis.

6. The torque converter according to claim 5, wherein a portion of the sinusoidal magnetic force pattern is deformed within a region between one of the first and second pluralities of permanent magnets and the third plurality of permanent magnets.

7. The torque converter according to claim 6, wherein the deformed portion of the sinusoidal magnetic force pattern is restored when the flywheel is further rotated about the first axis.

8. The torque converter according to claim 1, wherein the flywheel and the generator disk are separated by an air gap.

9. A system for generating electrical power, comprising:
   a motor;
   a flywheel coupled to the motor, the flywheel rotating about a first axis and including:

a first body portion;
a first plurality of permanent magnets mounted in the first body portion, each of the first plurality of permanent magnets extending along a corresponding radial axis direction with respect to the first axis; and
a second plurality of permanent magnets mounted in the first body portion; each of the second plurality of permanent magnets being located between a corresponding adjacent pair of the first plurality of permanent magnets;
at least one generator disk rotatable about a second axis perpendicular to the first axis and magnetically coupled to the flywheel, each generator disk including:
a second body portion; and
a third plurality of permanent magnets within the second body portion magnetically coupled to the first and second pluralities of permanent magnets; and
at least one electrical generator coupled to the at least one generator disk.

10. The system according to claim 9, wherein the motor is coupled to the flywheel using a first drive shaft to rotate the flywheel along the first axis, and the electrical generator is coupled to the generator disk using a second drive shaft.

11. The system according to claim 10, wherein the electrical generator disk includes a rotor coupled to the second drive shaft and a plurality of stators.

12. The system according to claim 11, further comprising a variable transformer coupled to the at least one electrical generator.

13. The system according to claim 9, wherein the flywheel further comprises a plurality of backing plates, each backing plate disposed adjacent to each of the first plurality of permanent magnets.

14. The system according to claim 13, wherein the backing plates force a magnetic field strength along the radial axis direction toward a circumference of the flywheel.

15. The system according to claim 14, wherein the first and second pluralities of permanent magnets and the backing plates form a sinusoidal magnetic force pattern along the circumference of the flywheel, and the third plurality of permanent magnets are magnetically coupled to the first and second pluralities of permanent magnets when the flywheel is rotated about the first axis.

16. The system according to claim 15, wherein a portion of the sinusoidal magnetic force pattern is deformed within a region between one of the first and second pluralities of permanent magnets and the third plurality of permanent magnets.

17. The system according to claim 16, wherein the deformed portion of the sinusoidal magnetic force pattern is restored when the flywheel is further rotated about the first axis.

18. The system according to claim 9, wherein the at least one generator disk includes a plurality of generator disks each disposed along a circumference of the flywheel.

19. The system according to claim 18, wherein a first plurality of the generator disks are rotatable about the second axis perpendicular to the first axis and are magnetically coupled to the flywheel, and a second plurality of the generator disks are rotatable about a third axis perpendicular to the first axis and the second axis and are magnetically coupled to the flywheel.

20. The system according to claim 18, wherein the at least one electrical generator includes a first plurality of electrical generators each coupled to one of the first plurality of generator disks, and a second plurality of electrical generators each coupled to one of the second plurality of generator disks.

21. A system for converting torque to power, comprising:
a motor;
a flywheel coupled to the motor, the flywheel rotating about a first axis and including:
a first body portion;
a first plurality of permanent magnets mounted in the first body portion, each of the first plurality of permanent magnets extending along a corresponding radial axis direction with respect to the first axis; and
a second plurality of permanent magnets mounted in the first body portion; each of the second plurality of permanent magnets being located between a corresponding adjacent pair of the first plurality of permanent magnets;
at least one generator disk rotatable about a second axis perpendicular to the first axis and magnetically coupled to the flywheel, each generator disk including:
a second body portion; and
a third plurality of permanent magnets within the second body portion magnetically coupled to the first and second pluralities of permanent magnets; and
a second drive shaft coupled to the second body portion rotating about the second axis.

22. The system according to claim 21, wherein the motor is coupled to the flywheel using a first drive shaft to rotate the flywheel along the first axis.

23. The system according to claim 21, wherein the flywheel further comprises a plurality of backing plates, each backing plate disposed adjacent to each of the first plurality of permanent magnets.

24. The system according to claim 23, wherein the backing plates force a magnetic field strength along the radial axis direction toward a circumference of the flywheel.

25. The system according to claim 24, wherein the first and second pluralities of permanent magnets and the backing plates form a sinusoidal magnetic force pattern along the circumference of the flywheel, and the third plurality of permanent magnets are magnetically coupled to the first and second pluralities of permanent magnets when the flywheel is rotated about the first axis.

26. The system according to claim 25, wherein a portion of the sinusoidal magnetic force pattern is deformed within a region between one of the first and second pluralities of permanent magnets and the third plurality of permanent magnets.

27. The system according to claim 26, wherein the deformed portion of the sinusoidal magnetic force pattern is restored when the flywheel is further rotated about the first axis.

28. The system according to claim 21, wherein the at least one generator disk includes a plurality of generator disks each disposed along a circumference of the flywheel.

29. The system according to claim 28, wherein a first plurality of the generator disks are rotatable about the second axis perpendicular to the first axis and are magnetically coupled to the flywheel, and a second plurality of the generator disks are rotatable about a third axis perpendicular to the first axis and the second axis and are magnetically coupled to the flywheel.

* * * * *